B. W. TAYLOR.
HARROW.
No. 172,796. Patented Jan. 25, 1876.
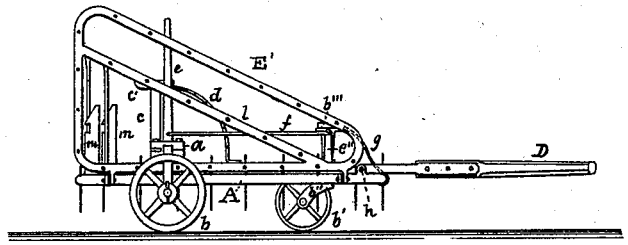
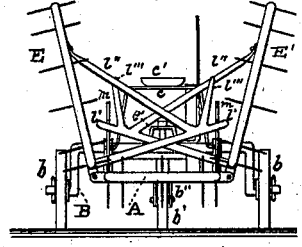
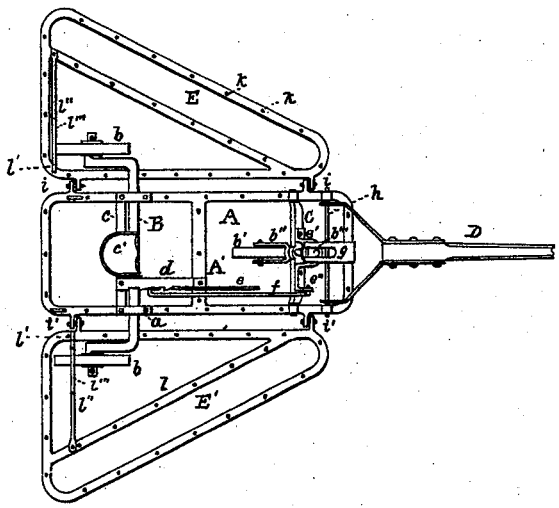
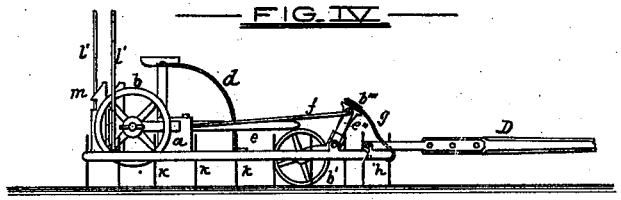
WITNESSES— INVENTOR—

UNITED STATES PATENT OFFICE.

BARDEN W. TAYLOR, OF ROSEVILLE, CALIFORNIA.

IMPROVEMENT IN HARROWS.

Specification forming part of Letters Patent No. 172,796, dated January 25, 1876; application filed July 12, 1875.

*To all whom it may concern:*

Be it known that I, BARDEN W. TAYLOR, of Roseville, in the county of Placer and State of California, have invented certain Improvements in Harrows, of which the following is a specification, reference being had to the accompanying drawing, forming a part hereof.

This invention relates to an improved harrow, which can be conveniently changed by the driver for road or field use, and which, being in sections, each of which can be separately raised or lowered, is capable of having its teeth set deep or shallow, or placed in such positions as to cause them to clear trees, stumps, or other obstacles without changing the course of the draft-team. Other advantages, as will appear hereinafter, attend the use of this invention.

In the accompanying drawing, Figure 1 is a side view of the harrow arranged for road use. Fig. 2 is a rear view of the machine, its parts being as in Fig. 1. Fig. 3 is a plan or top view of the machine arranged for field use. Fig. 4 is a side view, also showing the harrow adapted for use in the field.

Similar letters of reference indicate similar parts in all the views.

A is the central portion or rectangular supporting-frame of the harrow. This central portion, as well as the other parts of the frame, is made of tubular or other iron or wood, strongly and substantially joined. A crank axle or yoke, B, resting in bearings $a$, secured to the sides of the frame A, carries the hind wheels $b$ of the harrow-frame. The bearings $a$ also support the standards $c$, upon which rests the driver's seat $c'$. From the driver's seat extends forward the arc $d$, the lower end of which is secured to the cross-piece A' of the central frame A. One edge of the arc $d$ is provided with teeth, which engage with the lever $e$, extending up from the axle B, for purposes hereinafter explained.

The forward end of the central frame A is carried by the wheel $b'$, which is supported between the jaws of a pin, $b''$, adapted to turn in an axle, C, and a bearing, $e'$, secured thereto. A part of this bearing is turned up, as shown at $e''$, and receives the end of a rod, $f$, the other end of which is connected to the lever $e$ aforesaid. The upper end of the pin $b''$ is supplied with a cap or head, $b'''$, which, at certain times, and for a purpose understood from the following, is made to enter the brace $g$, extending from the front of the central frame A.

The draft-pole (represented by D) is secured to the frame A by means of the bolt $h$. Two additional frames, marked, respectively, E and E', are hinged to the respective sides of the central frame A at $i$ $i$ and $i'$ $i'$. The frames A, E, and E' carry harrow-teeth $k$, as shown, as also does the cross-piece A'.

The side frames E and E' approach the shape of a right-angle triangle, each having an extra bar, $l$, parallel with the hypotenuse of the triangle, which bar is also provided with harrow-teeth. Extending from the inner side of the frames E E' are irons $l'$, strengthened by braces $l''$, reaching therefrom to the extra bars $l$, and each having, also, connected with it a hand-lever, $l'''$. Projecting up from the rear of the central frame A, at each side thereof, is a hook, $m$.

When the harrow is to be adjusted from a field to a road condition the driver pulls each of the levers $l'''$ back toward and behind the seat, the iron $l'$ of the right-hand lever $l'''$ being locked by the left-hand hook $m$, and the iron $l'$ of the left-hand lever by the right-hand hook $m$. The wings or side frames E and E' are thus lifted and held up, as seen in Figs. 1 and 2.

The central frame A is raised for road use by the driver causing the lever $e$ to engage the rear notch of the arc $d$, thus bringing the crank-axle or yoke B to a vertical position, as seen in Fig. 1. This movement also straightens up the front wheel $b'$ by means of the rod $f$.

When the harrow is to be employed in the field the side frames E E', if both are at the time required, are allowed to fall, the driver disengaging the respective levers and hooks. The central frame A is lowered by causing the lever $e$ to engage one of the forward teeth of the arc $d$, as the depth of set of the harrow-teeth may require, the head $b'''$ of the front-wheel pin $b''$ being allowed to enter the brace $g$, which prevents the wheel-pin from turning.

The entire machine is thus under the control of the driver, who can raise one or both sides or the central part, in order to clear stumps, &c., or for other purposes, without changing the course of the team. The set of the teeth is also as easily regulated to suit the various conditions of the soil. By raising one of the sides the harrowing can be done around trees, the rectangular shape of the central frame admitting of close work.

The machine can be converted into a stiff harrow, should such be required for exceptional uses, by holding the wings or side frames E E' down by means of a board or other device, in which case the weight of the driver can be placed upon the board. Each section is independent of the other two, and can be raised or lowered separately, to suit the varying surfaces of the field.

Having described my invention, what I claim as new, and wish to secure by Letters Patent of the United States, is—

1. The adjustable crank-axle or yoke B, carrying the hind wheels $b$, and supported upon the central rectangular harrow-frame A, in combination with said frame A and the hinged triangular side frames E E', said frames E E' being placed under the crank-axle B, surrounding the wheels $b$, and being adapted to be raised and supported clear of said axle and wheels, substantially as and for the purposes specified.

2. The combination of the crank-axle or yoke B, lever $e$, rod $f$, front axle C, bearings $e'$ $e''$, wheel-pin $b''$ $b'''$, and front wheel $b'$, substantially as and for the purposes herein set forth.

3. The brace $g$, extending back from the front of the central frame A, combined with the front axle C, bearing $e'$ $e''$, and wheel-pin $b''$, having the head $b'''$, substantially as and for the purposes specified.

4. In combination with the side frames E E', the irons $l'$, braces $l''$, and hand-levers $l'''$, all connected substantially as and for the purposes set forth.

5. The hooks $m$, extending up from the central frame A, each combined with the iron $l'$ at the opposite side of said frame, substantially as and for the purposes specified.

In testimony whereof I have hereto subscribed my name.

BARDEN W. TAYLOR.

Witnesses:
   ALBERT WOODRUFF,
   J. D. PRATT,
   CHAS. KEENER.